(12) United States Patent
Hatayama et al.

(10) Patent No.: US 7,273,670 B2
(45) Date of Patent: Sep. 25, 2007

(54) FUEL CELL POWER GENERATING SYSTEM

(75) Inventors: Tatsuji Hatayama, Osaka-fu (JP); Akira Hamada, Osaka-fu (JP)

(73) Assignee: Sanyo Electric Co., Ltd., Osaka (JP)

( * ) Notice: Subject to any disclaimer, the term of this patent is extended or adjusted under 35 U.S.C. 154(b) by 388 days.

(21) Appl. No.: 10/149,418

(22) PCT Filed: Dec. 20, 2000

(86) PCT No.: PCT/JP00/09055

§ 371 (c)(1),
(2), (4) Date: Nov. 22, 2002

(87) PCT Pub. No.: WO01/48850

PCT Pub. Date: Jul. 5, 2001

(65) Prior Publication Data

US 2004/0023094 A1    Feb. 5, 2004

(30) Foreign Application Priority Data

Dec. 24, 1999  (JP)  ................. 11-366966

(51) Int. Cl.
*H01M 8/04*  (2006.01)
*H01M 8/10*  (2006.01)
(52) U.S. Cl. .............. 429/12; 429/26; 429/30
(58) Field of Classification Search ............ None
See application file for complete search history.

(56) References Cited

U.S. PATENT DOCUMENTS 6,106,964 A * 8/2000 Voss et al. ............ 429/20

6,511,052 B1    1/2003  Young et al.
2003/0025219 A1  2/2003  Tonkin et al.

FOREIGN PATENT DOCUMENTS

JP   9-312166    * 12/1997
WO   01/11216 A2    2/2001

OTHER PUBLICATIONS

English translation of Patent Abstract of Japan, No. 9-312166, dated Dec. 2, 1997, See PCT search report.
English translation of Patent Abstract of Japan, No. 11-31519, dated Feb. 2, 1999. See PCT search report.
English translation of Patent Abstract of Japan, No. 8-64218, dated Mar. 8, 1996. See PCT search report.
English translation of Patent Abstract of Japan, No. 11-40179, dated Feb. 12, 1999. See PCT search report.

* cited by examiner

*Primary Examiner*—Jonathan Crepeau
(74) *Attorney, Agent, or Firm*—Westerman, Hattori, Daniels & Adrian, LLP.

(57) ABSTRACT

The fuel cell power generation system of present invention can supply the air pole of a fuel cell with a clean air free from impurities, by providing at least one or more humidification filters kept in a wet state by a water supply means, disposed in an oxidant gas supply passage of the fuel cell body. As a result, the cell output properties can be improved by preventing the decrease of gas dissipation ability or the decrease of electric conductance of the solid polymer film provoked by impurities.

10 Claims, 4 Drawing Sheets

Module life test (with/without filter)

FUEL CELL POWER GENERATING SYSTEM

FIELD OF THE INVENTION

The present invention relates to a fuel cell power generation system, using a fuel cell, and more particularly, to a fuel cell power generation system for preventing the output characteristics of the fuel cell from deteriorating, by eliminating easily and effectively fine dust, salt or other impurities contained in the air to be supplied to an air pole of the fuel cell, and at the same time, for preventing the electric conduction of a solid polymer member from lowering, by conveniently humidifying air supplied to the air pole.

BACKGROUND ART

The fuel cell is sometimes applied to the power generation system and, in the prior art, for example, a fuel cell power generation system as shown in FIG. 6 has been developed. This fuel cell power generation system S comprises a fuel cell body A made of stacked body of unit cells, a fuel processing apparatus C modifying pure hydrogen or hydrocarbon base fuel B into hydrogen rich gas and supplying to a fuel cell body A, a reaction air supply apparatus D for supplying the fuel cell body A with air as oxidant, a power conversion apparatus (not shown) for converting a direct current output from the fuel cell body A into an alternating current output, and a control apparatus (not shown) controlling these sections.

Said reaction air supply apparatus D comprises a pretreatment filter E and an air fan F, eliminates dust in the air by the pretreatment filter E and supplies an air pole G of the fuel cell body A by the air fan F.

When a fuel cell if of solid polymer type, as shown in FIG. 7, an unit cell H comprises a solid polymer film J which is an electrolyte layer, air poles G (cathode) disposed at both sides thereof, a fuel pole K (anode), and air pole side passage substrate L disposed still at both sides thereof, and a separator N is interposed between respective unit cells H, for stacking and integrating a number of unit cells H.

By the way, said reaction air supply apparatus D of the prior art certainly removes dust contained in the air (atmosphere) and purifies as mentioned above; however, in practice, it removes only rough dust, and can not eliminate fine dust, salt or other impurities. Fine dust, salt or other impurities remaining in the reaction air are supplied as they are into the air pole G through the pretreatment filter E.

Such impurities in the air, reach at the electrode catalyst layer of the air pole G, sticks to the electrode catalyst layer and, depending on the nature of impurities, dissolve in the water generated at the air pole G. As a result, the gas dissipation of the electrode catalyst layer lowers, or the electric conductance of the solid polymer film J which is a solid polymer or electrolyte layer existing in the electrode catalyst lowers by impurity cation generated by dissolution, provoking a phenomenon of deterioration of the output characteristics.

In addition, in the solid polymer type fuel cell, as disclosed for instance in the Japan Patent Publication HEI 8-64218, the electric conductance of the solid polymer film J depends largely on the wetness of the solid polymer film J, and the electric conductance drops when the solid polymer film J exposed to a dry air dries up. Consequently, it is necessary to supply water all the times for humidification.

The present invention devised to solve the aforementioned problems of the prior art, and has an object of preventing the output characteristics of the fuel cell from deteriorating, by eliminating easily and effectively fine dust, salt or other impurities contained in the air to be supplied to an air pole of the fuel cell, and at the same time, for preventing the electric conduction of a solid polymer member from lowering, by conveniently humidifying air supplied to the air pole.

DISCLOSURE OF THE INVENTION

As a technical means for achieving this object, the subject matter of the present invention concerns a fuel cell power generation system comprising at least one or more humidification filter(s) kept in a wet state by a water supply means, disposed in an oxidant gas supply passage of the fuel cell body.

Also, the subject matter concerns this fuel cell power generation system, wherein:

the humidification filter is composed of a sheet shape porous material having a water absorbing or hydrophilic property;

the humidification filter is composed by disposing with a distance at least two or more layers of sheet shape porous material having a water absorbing or hydrophilic property;

an passage is provided for communicating a cooling water circulation passage or humidifying water circulation passage of the fuel cell body and the humidification filter to be humidified and said humidification filter is kept a wet state with water supplied from this passage;

a condenser means for collecting generated water in the non reacted air discharged from the fuel cell body, and water collected by this condenser means is used for humidifying the humidification filter;

a part of water supplied from outside the fuel cell system is used for humidifying the humidification filter;

in a fuel cell power generation system having a fuel processing apparatus for generating a hydrogen rich modified gas by modifying input fuel, water collected from said fuel processing apparatus is used for humidifying the humidification filter;

further, the humidification filter and a water supply means have a mutual contact structure, the water supply means to the humidification filter is disposed with a distance from this humidification filter, and has a structure to supply said humidification filter with water by pulverizing or dropping water by this water supply means; and the water supply means to the humidification filter is a water reservoir installed under this humidification filter, and the humidification filter is kept in a wet sate by making water of this water reservoir in contact with said humidification filter.

The present invention can supply the air pole of a fuel cell with a clean air free from impurities, by providing the reaction air supply apparatus with an impurities elimination means for removing fine dust, salt or the like in the air. As a result, the cell output properties can be improved by preventing the decrease of gas dissipation ability or the decrease of electric conductance of the solid polymer film provoked by impurities.

Moreover, it becomes possible to wet approximately evenly the humidification filter with supplied water and keep its wet state, by using, for instance, a sheet shape porous material presenting a high water absorption, as humidification filter, and it can be intended to increase the ability to capture impurities in the air and improve the electric conductance by humidifying conveniently the solid polymer film with humidified air. Further, the provision of humidification filter in the oxidant gas supply passage allows to supply the fuel cell body with air in humidified state, to keep the humidified state of the solid polymer film and to maintain a good electric conductance of the solid polymer film.

BEST MODE FOR CARRYING OUT THE INVENTION

Figure 1:
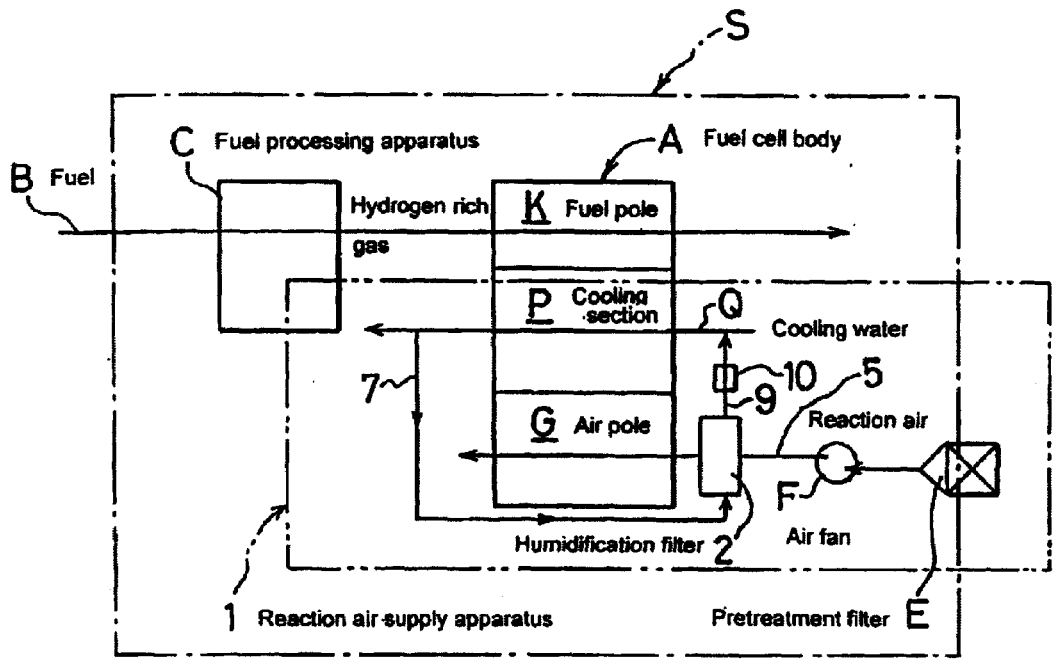
FIG. 1 is a composition diagram showing an embodiment of the fuel cell power generation system using an reaction air supply apparatus according to the invention.

Next, the embodiment of air supply apparatus for cell according to the invention will be described based on attached drawings. Here, the same composition members as the prior art will have the same symbol to facilitate the comprehension of the invention. In FIG. 1, 1 is a reaction air supply apparatus in a fuel cell power generation system 1, comprising a pretreatment filter E, an air fan F, and a humidification filter 2 humidified with water.

Figure 3:
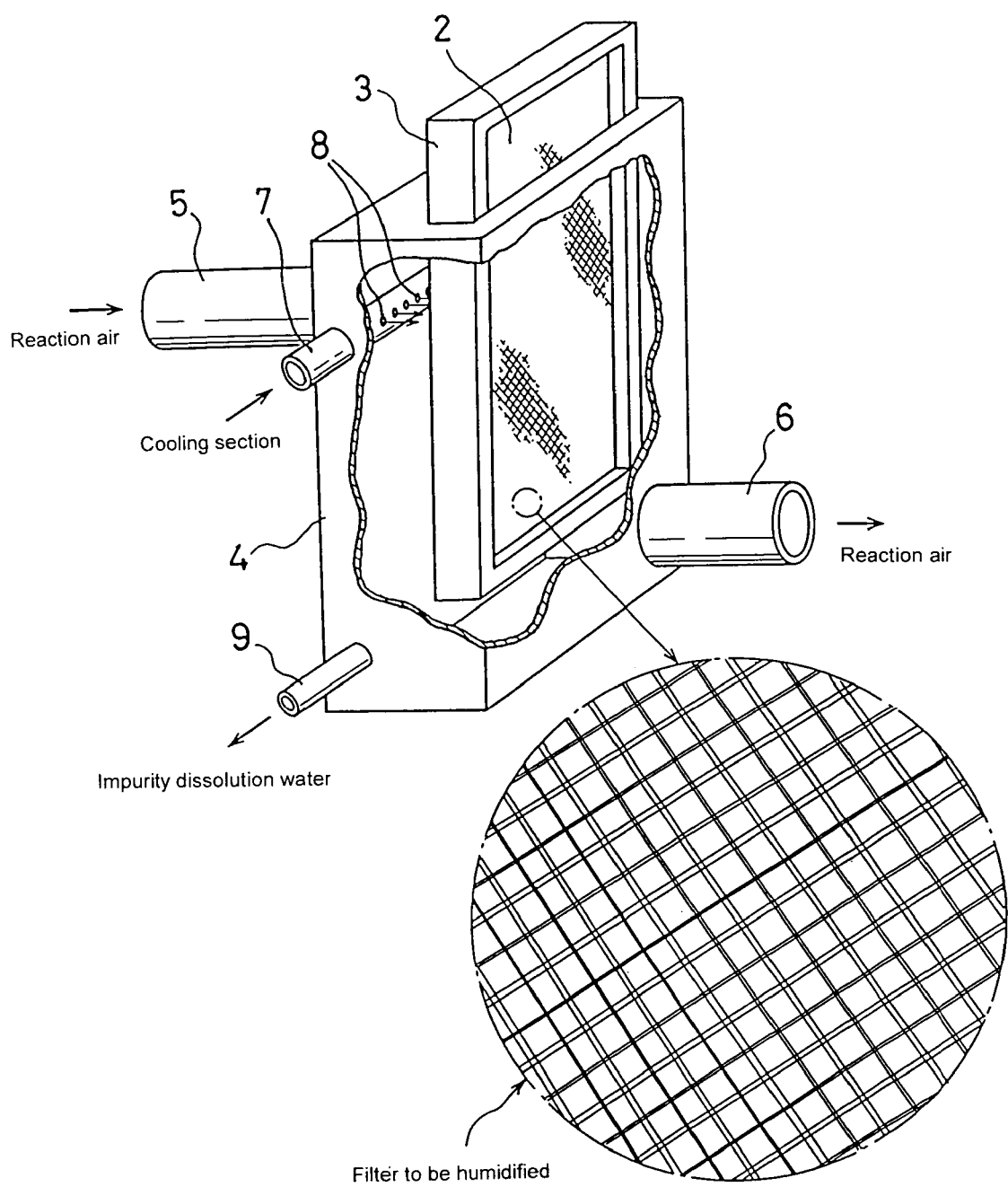
FIG. 3 is a partially broken outline perspective view showing an example of water supply means of the humidification filter.

Said humidification filter 2 is composed of a sheet shape porous material presenting water absorption or hydrophilic property and, for instance, kept upright in a housing 4 by attaching a frame 3 around it as shown in FIG. 3. In this case, the filter body composed of sheet shape porous material has a single layer structure; however, it is possible to have a multilayer structure disposing 2 layers or more with an appropriate distance.

Said housing 4 is provided with an air inlet pipe 5 of reaction air at the back side, and this air inlet pipe 5 is connected to said air fan F, and reaction air ventilated by the air fan F flows into the housing through the air inlet pipe 5. Moreover, an exhaust pipe 6 of reaction air is mounted on the front side of the housing 4 and this exhaust pipe 6 is connected to supply an air pole side circulation substrate L of said fuel cell body A with reaction air. This allows to supply an air pole G with reaction air introduced into the housing 4 and having passed through said humidification filter.

Further, a water inlet pipe 7 leading from the side upper part of the housing 4 to the inside of the housing 4 is mounting horizontally, and this water inlet pipe 7 has a plurality of nozzles 8 or small holes are juxtaposed at a portion in the housing 4, and at the side opposed to said humidification filter 2, and the pipe end section is closed. Consequently, water introduced into the housing 4 through the water inlet pipe 7 is pulverized from the nozzle 8 or small hole and can maintain said humidification filter 2 in an approximately evenly humidified state. Though not illustrated, in some cases, the water inlet pipe 7 is composed to dispose over the humidification filter 2 and to drop water from a plurality of small holes opened at the bottom.

On the other hand, a drain pipe 9 is mounted at the side under part of the housing 4 for draining impurities dissolution water flowing from said humidification filter 2 out of the housing 4. This drain pipe 9 and said water inlet pipe 7 are respectively connected to a cooling water circulation passage Q for supplying a cooling section P of the fuel cell body A as shown in FIG. 1 and form a circulation type by-pass. At this moment, a water treatment apparatus 10 is installed in the middle for water purification, so that tainted water discharged from the drain pipe 9 of the housing 9 may not enter the cooling water circulation passage Q.

As for water supply means for the humidification filter 2, otherwise, for instance, a (not shown) humidification water circulation for supplying a fuel pole side passage substrate M with water for humidifying said solid polymer film J may be used, generated water in the non reacted air discharged from the fuel cell body A may be collected by a (not shown) condensation means and used, a part of water supplied from outside the fuel cell power generation system S may be used, or other various means can be devised.

Figure 2:
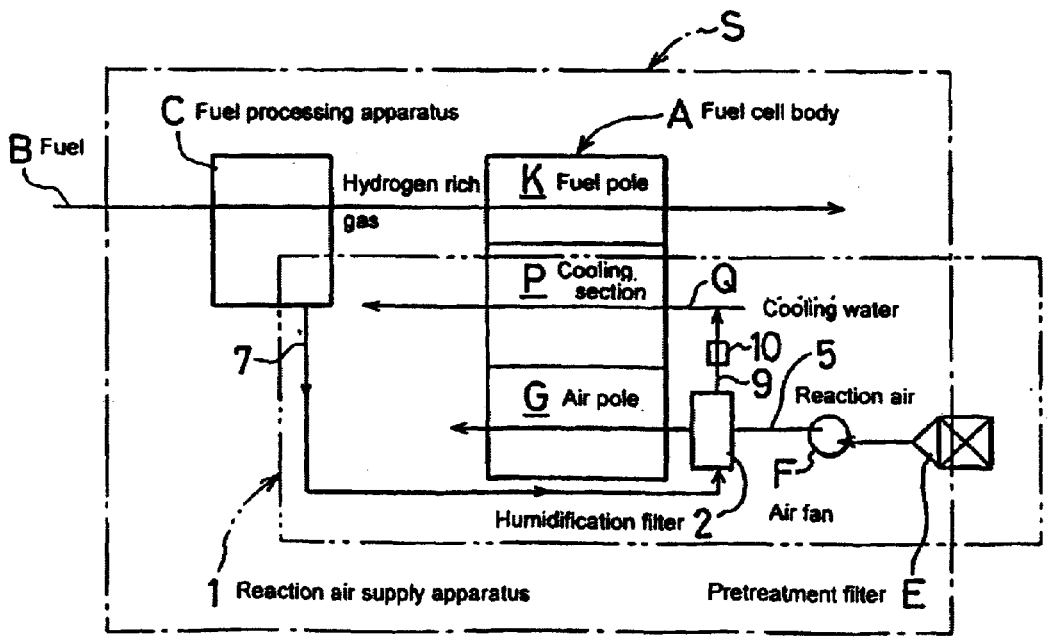
FIG. 2 is a composition diagram showing an embodiment of the fuel cell power generation system using another reaction air supply apparatus according to the invention.

Further, it is also possible to used water collected from a fuel processing apparatus C of the fuel cell power generation system S as shown in FIG. 2. As for water collected from the fuel processing apparatus C, cooling water used in the fuel processing apparatus C or condensed water obtained by condensing water vapor contained in burner exhaust gas of the fuel processing apparatus C, or the like can be used.

Figure 4:
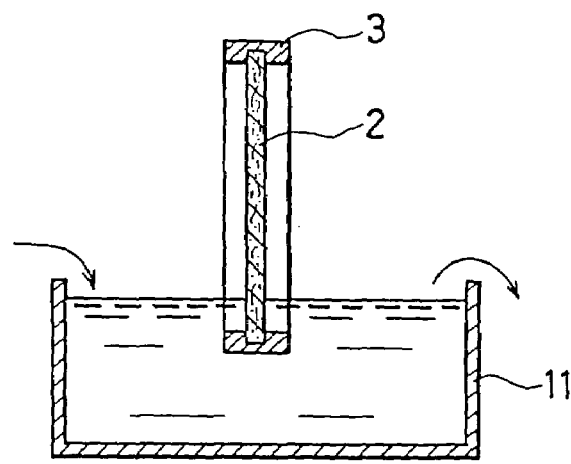
FIG. 4 illustrates another water supply means of the humidification filter.

In addition to the aforementioned indirect water supply method, a direct water supply method making the humidification filter 2 and its water supply means into contact, and as an example thereof, a water reservoir 11 is installed under the humidification filter 2 as shown in FIG. 4, and the lower end section of the humidification filter 2 is made into contact with water in this water reservoir 11. The humidification filter 2 sucks water by capillary phenomenon of the filter itself to become approximately evenly humidified state. In this case, it is preferable that the water reservoir 11 be supplied with water and held so that the water level becomes approximately a fixed height, and to flow tainted water containing impurities having passed through the humidification filter out of the water reservoir 11. The structure of water supply means becomes extremely simplified, as special equipment is not required for humidification.

In the fuel cell power generation system S of FIG. 1, the fuel processing apparatus C is supplied with hydrocarbon base fuel, which is modified into hydrogen rich gas, and supplied to a fuel pole K of the fuel cell body A, while the air pole G is supplied with air taken from the atmosphere and having passed through the pretreatment filter E and the humidification filter 2, for generating power in the fuel cell body A. In short, hydrogen rich gas is decomposed into hydrogen ion and electron at the fuel cell K, hydrogen ion moves to the air pole G through the solid polymer film J, electron flows into the air pole G through an external circuit, and they react with oxygen in the air supplied to the air pole G for generating water.

At this time, air taken from the atmosphere contains dust, salt or other impurities, rough dust is eliminated during the passage through the pretreatment filter E, and fine dust, salt or other impurities that were not removed by the pretreatment filter E are eliminated during the passage through the humidification filter 2 ventilated by the air fan F. The humidification filter 2, being kept in the aforementioned approximately evenly humidified state, can eliminate impurities effectively.

Thus, as the air pole G is supplied with clean reaction air, impurities in the air do not stick to the air pole G or dissolve in the water generated at the air pole G; therefore, minus phenomena such as decrease of gas dissipation ability, decrease of electric conductivity of the solid polymer film J which is a solid polymer or electrolyte layer by impurity cation generated by dissolution, or deterioration of output characteristics can be avoided.

Water branched from said cooling water circulation passage Q is pulverized and supplied to the humidification filter 2 through the nozzle 8 or small hole from the water supply pipe 7, tainted water containing fine dust, salt or other impurities passes through the humidification filter 2 and is discharged outside the housing 4 from the drain pipe 9, purified in a water processing apparatus 10 and then joins the cooling water circulation passage Q. Thus, the cooling water circulates along the circulation by-pass and is recycled.

In addition, clean reaction air supplied to the air pole G is conveniently humidified during the passage through the humidification filter 2, preventing said solid polymer film J being exposed to the dry reaction air, so the phenomenon that the solid polymer film J dries up and deteriorates the electric conductance can be avoided.

Similarly, in the fuel cell power generation system S of FIG. 2, the fuel processing apparatus C is supplied with hydrocarbon base fuel, which is modified into hydrogen rich gas, and supplied to a fuel pole K of the fuel cell body A, while the air pole G is supplied with air taken from the atmosphere and having passed through the pretreatment filter E and the humidification filter 2, for generating power in the fuel cell body A as mentioned above.

In this case also, rough dust of the air taken from the atmosphere is eliminated during the passage through the pretreatment filter E, and fine dust, salt or other impurities that were not removed by the pretreatment filter E are eliminated during the passage through the humidification filter 2 ventilated by the air fan F. At this moment, as the humidification filter 2, being kept in the approximately evenly humidified state, can eliminate impurities effectively.

As the air pole G is supplied with clean reaction air, impurities in the air do not stick to the air pole G or dissolve in the water generated at the air pole G; therefore, decrease of gas dissipation ability, decrease of electric conductivity of the solid polymer film J which is a solid polymer or electrolyte layer by impurity cation generated by dissolution, or deterioration of output characteristics can be avoided.

Water taken from the fuel processing apparatus C is pulverized and supplied to the humidification filter 2 through the nozzle 8 or small hole from the water supply pipe 7, tainted water containing fine dust, salt or other impurities passes through the humidification filter 2 and is discharged outside the housing 4 from the drain pipe 9, purified in a water processing apparatus 10 and then joins the cooling water circulation passage Q.

In this case also, clean reaction air supplied to the air pole G is conveniently humidified during the passage through the humidification filter 2, preventing said solid polymer film J being exposed to the dry reaction air; therefore, said solid polymer film J does not dry up and the electric conductance does not lower.

In order to verify the performance of the humidification filter 2 shown in FIG. 1 and FIG. 2, a simulated reaction air containing 5 weight % of saline as impure gas ingredient is input into the air supply apparatus, and the saline concentration of the obtained reaction air was measured. As the result, in case of either FIG. 1 or FIG. 2, the salt concentration of the air treated by the humidification filter 2 has dropped under the detection limit of the salt concentration measuring apparatus. Also, for a gas containing similarly fine dust, it has been verified that it is provided with a sufficient removing performance.

Figure 5:
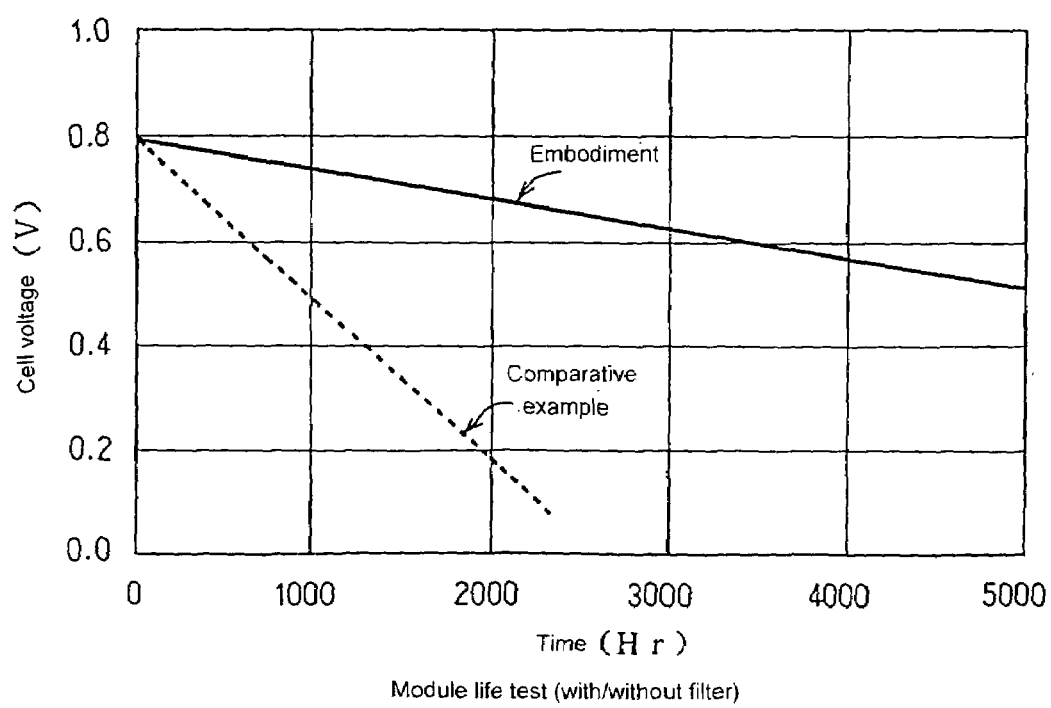
FIG. 5 is a graph showing the variation of cell voltage with time obtained by the experiment.
Figure 6:
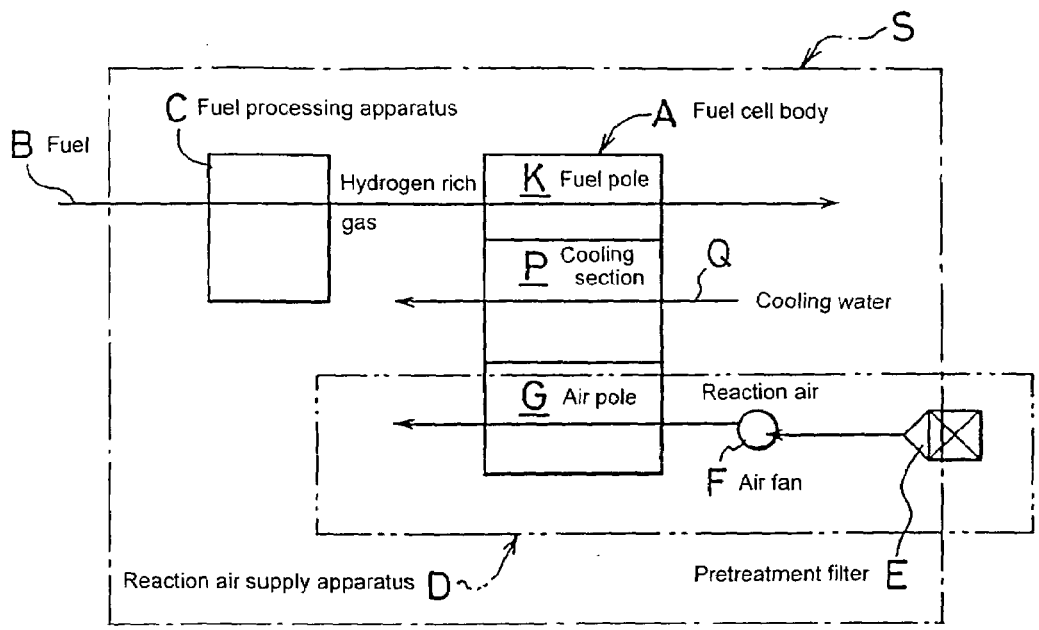
FIG. 6 is a composition diagram showing an embodiment of the fuel cell power generation system using an reaction air supply apparatus according to the prior art.
Figure 7:
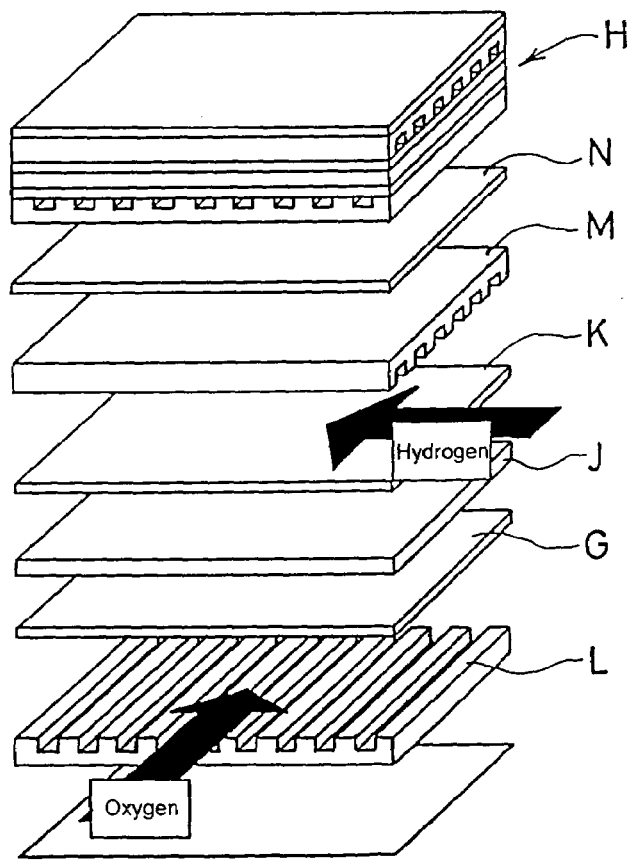
FIG. 7 is a decomposed perspective view of the fuel cell body of the fuel cell power generation system.

In addition, FIG. 5 shows the cell voltage variation with time obtained as the result of an operation, supplying the fuel cell power generation system 5 of FIG. 1 (embodiment) and FIG. 5 (comparative example) with a simulated reaction air containing 5 weight % of saline, and pure hydrogen gas. As evident from the same drawing, the fuel cell power generation system of this embodiment can control the decrease of the cell voltage according to the increase of operation time, and supply a fuel cell power generation system excellent in reliability.

As mentioned hereinbefore, in the present invention, the reaction sir supply apparatus of the fuel cell power generation system being composed to provide a humidified air filter as impurities elimination means for removing impurities contained in the air, fine dust, salt or other purities that can not be removed by the pretreatment filter can be adhered and removed effectively, and supply clean reaction air to the air pole of the fuel cell body. Thus, decrease of gas dissipation provoked conventionally by supplying the air pole with reaction air containing impurities, and decrease of electric conductance of the solid polymer film under the effect of impurity cation generated by dissolution can be prevented, and problems such as decrease of cell characteristics of the fuel cell provoked by them can be resolved.

In addition, the humidification of reaction air has also a secondary effect of being performed during the passage of the humidification filter, the decrease of electric conductance by the drying of the humidification filter is prevented, and the problem of the voltage drop of the full cell can also be resolved, and it can be intended to improve the reliability of the fuel cell and prolong its life.

Industrial Application Field

INDUSTRIAL APPLICABILITY

The fuel cell power generation system of the present invention is industrially useful, because it can prevent the output properties of the fuel cell, by removing easily and effectively fine dust, salt or other impurities contained in the air to be supplied to the air pole of the fuel cell, and at the same time, the electric conductance of the solid polymer film from decreasing, by humidifying conveniently the air to be supplied to the air pole.

The invention claimed is:

1. A fuel cell power generation system, comprising at least one or more humidification filters kept in a wet state always at least during supplying an oxidant gas to the fuel cell by a means for supplying liquid water, disposed in an oxidant gas supply passage to an air pole of a fuel cell body, said humidification filter adapted to continually eliminate impurities from and continually humidify incoming oxidant gas, a means for draining the water containing impurities from said humidification filter.

2. The fuel cell power generation system of claim 1, wherein: the humidification filter is composed of a sheet shape porous material having a water absorbing or hydrophilic property.

3. The fuel cell power generation system of claim 1, wherein:

the humidification filter is composed by disposing with a distance at least two or more layers of sheet shape porous material having a water absorbing or hydrophilic property.

4. The fuel cell power generation system of claim 1, wherein: a passage is provided for communicating a cooling water circulation passage or humidifying water circulation passage of the fuel cell body and the humidification filter to be humidified, and said humidification filter is kept a wet state with water supplied from the passage.

5. The fuel cell power generation system of claim 1, wherein: a condenser means for collecting generated water in the non reacted air discharged from the fuel cell body is provided, and water collected by said condenser means is used for humidifying the humidification filter.

6. The fuel cell power generation system of claim 1, wherein: a part of water supplied from the outside of the fuel cell system is used for humidifying the humidification filter.

7. The fuel cell power generation system of claim 1, having a fuel processing apparatus for generating a hydrogen rich modified gas by modifying input fuel is provided, and water collected from said fuel processing apparatus is used for humidifying the humidification filter.

8. The fuel cell power generation system of claim 1, 4, 5, 6, or 7, wherein: the humidification filter and a means for supplying water are into contact with each other.

9. The fuel cell power generation system of claim 1, 4, 5, 6, or 7, wherein: the means for supplying water to the humidification filter is disposed with a distance from this humidification filter, and has a structure to supply said humidification filter with water by atomizing or dropping water by said means for supplying water.

10. The fuel cell power generation system of claim 1, 4, 5, 6, or 7, wherein: the means for supplying water to the humidification filter comprises a water reservoir installed under said humidification filter, and said humidification filter is kept in a wet state by making contact with the water in said water reservoir.

* * * * *